US011356044B2

(12) United States Patent
Wang et al.

(10) Patent No.: US 11,356,044 B2
(45) Date of Patent: Jun. 7, 2022

(54) METHOD FOR DETECTING MOTOR INITIAL PHASE AND PHASE SEQUENCE AND SYSTEM FOR CONTROLLING PERMANENT-MAGNET SYNCHRONOUS MOTOR

(71) Applicant: QKM TECHNOLOGY (DONG GUAN) CO., LTD, Dongguan (CN)

(72) Inventors: Bin Wang, Dongguan (CN); Chi Sha, Fremont, CA (US); Lihui Chen, Dongguan (CN); Rongkui Zheng, Dongguan (CN); Hui Du, Dongguan (CN); Yu Lei, Dongguan (CN); Jiang Liu, Dongguan (CN)

(73) Assignee: QKM TECHNOLOGY (DONG GUAN) CO., LTD, Dongguan (CN)

( * ) Notice: Subject to any disclaimer, the term of this patent is extended or adjusted under 35 U.S.C. 154(b) by 1 day.

(21) Appl. No.: 17/251,235

(22) PCT Filed: Jul. 10, 2019

(86) PCT No.: PCT/CN2019/095373
§ 371 (c)(1),
(2) Date: Dec. 11, 2020

(87) PCT Pub. No.: WO2020/011185
PCT Pub. Date: Jan. 16, 2020

(65) Prior Publication Data
US 2021/0265932 A1 Aug. 26, 2021

(30) Foreign Application Priority Data
Jul. 10, 2018 (CN) .......................... 01810751639.1

(51) Int. Cl.
H02P 21/00 (2016.01)
H02P 21/18 (2016.01)
H02P 21/22 (2016.01)

(52) U.S. Cl.
CPC .............. *H02P 21/18* (2016.02); *H02P 21/22* (2016.02); *H02P 2207/05* (2013.01)

(58) Field of Classification Search
CPC .................................. H02P 21/18; H02P 21/22
(Continued)

(56) References Cited

U.S. PATENT DOCUMENTS 9,948,224 B1* 4/2018 Huh ........................ H02P 21/24
2012/0217912 A1 8/2012 Wu et al.
(Continued)

FOREIGN PATENT DOCUMENTS

| CN | 103825518 A | 5/2014 |
| CN | 108900121 A | 11/2018 |
| DE | 112013004007 T5 | 4/2015 |

OTHER PUBLICATIONS

Extended European Search Report, EP19834321.2, dated Mar. 16, 2022.

*Primary Examiner* — Erick D Glass

(57) ABSTRACT

The present invention provides a method for detecting motor initial phase and phase sequence and a system for controlling a permanent-magnet synchronous motor. The method is applied to the system and comprises sequentially acquiring, through an encoder, first displacement data which register the encoder's reading when a rotor spins to a Q-axis, second displacement data which register the encoder's reading when the rotor spins from the Q-axis to a D-axis, third displacement data which register the encoder's reading when the rotor spins from the D-axis to a negative Q-axis and fourth displacement data which register the encoder's reading when the rotor spins from the negative Q-axis to the (Continued)

D-axis; obtaining an initial phase of the motor to be detected according to the second displacement data, the fourth displacement data and the encoder's CPR; and determining the phase sequence of the motor based on the first displacement data, the second displacement data and the encoder's CPR. That is to say, the method can not only automatically detect the initial phase of the rotor, but also the motor wiring phase sequence, and overcome the influence of friction force to improve the initial phase detection precision.

15 Claims, 8 Drawing Sheets

(58) Field of Classification Search
USPC .................................................... 318/400.02
See application file for complete search history.

(56) References Cited

U.S. PATENT DOCUMENTS

| 2012/0217921 | A1 | 8/2012 | Wu et al. | |
|---|---|---|---|---|
| 2015/0123577 | A1* | 5/2015 | Omata | B60L 50/16 |
| | | | | 318/400.15 |
| 2018/0115267 | A1* | 4/2018 | Kulkarni | H02P 21/0089 |
| 2021/0214000 | A1* | 7/2021 | Miki | H02P 21/12 |

* cited by examiner

METHOD FOR DETECTING MOTOR INITIAL PHASE AND PHASE SEQUENCE AND SYSTEM FOR CONTROLLING PERMANENT-MAGNET SYNCHRONOUS MOTOR

RELATED APPLICATIONS

The application is a national phase application of the International Application PCT/CN2019/095373 filed Jul. 10, 2019, which claims the benefit of the Chinese Patent Application CN201810751639.1 filed Jul. 10, 2018, each of which is incorporated herein by reference in its entirety.

FIELD OF THE INVENTION

The present invention relates to the technical field of motors, in particular to a method for detecting motor initial phase and phase sequence and a system for controlling a permanent-magnet synchronous motor.

BACKGROUND OF THE INVENTION

On many occasions, for normal control, permanent-magnet synchronous motors need to be wired in a UVW phase sequence, which, as a result, constrains users to a fixed wiring manner. Once the motors are wired incorrectly, it will result in abnormal operation of the motors and even serious casualties. Moreover, many detection methods are performed manually rather than automatically, and there is no phase sequence detection function currently. Furthermore, many existing methods for detecting an initial phase of a motor have low precision, thereby affecting the operating efficiency of the motors. Only when the initial phase of a rotor is accurately acquired, the motor can exert the maximum torque performance.

OBJECTS AND SUMMARY OF THE INVENTION

One object of this invention is to provide a method for detecting motor initial phase and phase sequence and a system for controlling a permanent-magnet synchronous motor, so as to solve at least one of the problems mentioned hereinabove.

Embodiments of the invention provide a method for detecting motor initial phase and phase sequence in a system for controlling a permanent-magnet synchronous motor. The system comprises a motor to be detected and an encoder. A rotor of the motor is coaxially connected with the encoder. The method comprises acquiring through the encoder the following displacement data of the rotor sequentially: first displacement data which register the encoder's reading when the rotor spins to a Q-axis, second displacement data which register the encoder's reading when the rotor spins from the Q-axis to a D-axis, third displacement data which register the encoder's reading when the rotor spins from the D-axis to a negative Q-axis and fourth displacement data which register the encoder's reading when the rotor spins from the negative Q-axis to the D-axis; obtaining the initial phase of the motor based on the second displacement data, the fourth displacement data and the encoder's CPR (counts per revolution); and determining the phase sequence of the motor based on the first displacement data, the second displacement data and the encoder's CPR.

Optionally, the determining step in the method includes detecting, based on the first displacement data, the second displacement data and the encoder's CPR, whether a first rotation direction of the rotor rotating from a zero point of the encoder to a position corresponding to the first displacement data is the same as a second rotation direction from the position corresponding to the first displacement data to a position corresponding to the second displacement data; if not the same, then the motor is wired in a positive phase sequence; and if the same, then the motor is wired in a negative phase sequence.

Optionally, the determining step in the method includes calculating a first difference between the first displacement data and the second displacement data; and comparing the first difference with a positive or negative value of half of the encoder's CPR; if the first difference is greater than zero but less than the positive value of half of the encoder's CPR, then the motor is wired in a positive phase sequence; if the first difference is both less than zero and less than the negative value of half of the encoder's CPR, then the motor is wired in a positive phase sequence; if the first difference is less than zero but greater than the negative value of half of the encoder's CPR, then the motor is wired in a negative phase sequence; and if the first difference is both greater than zero and greater than the positive value of half of the encoder's CPR, then the motor is wired in a negative phase sequence.

Optionally, the acquiring step in the method includes initiating a Q-axis current control stage for moving the rotor towards the Q-axis; acquiring the first displacement data through the encoder when the rotor arrives at the Q-axis; initiating a D-axis current control stage for moving the rotor towards the D-axis; acquiring the second displacement data through the encoder when the rotor arrives at the D-axis; initiating a negative Q-axis current control stage for moving the rotor towards the negative Q-axis; acquiring the third displacement data through the encoder when the rotor arrives at the negative Q-axis; initiating the D-axis current control stage for moving the rotor towards the D-axis; and acquiring the fourth displacement data through the encoder when the rotor arrives at the D-axis.

Optionally, in the method, the Q-axis current control stage is initiated by executing a closed-loop Q-axis current instruction in a current closed-loop control mode; the Q-axis current instruction is a ramp current signal; the D-axis current control stage is initiated by executing a closed-loop D-axis current instruction in a current closed-loop control mode; the D-axis current instruction is a ramp current signal; the negative Q-axis current control stage is initiated by executing a closed-loop negative Q-axis current instruction in a current closed-loop control mode; and the negative Q-axis current instruction is a ramp current signal.

Optionally, the method further comprises initiating an initial phase detection mode in response to user operation; and starting timing for initiating a corresponding current control stage when a reading meets preset conditions, wherein the current control stage includes the Q-axis current control stage, the D-axis current control stage and the negative Q-axis current control stage.

Optionally, a corresponding current control stage is initiated by initiating the Q-axis current control stage when the reading is less than a preset first threshold; initiating the D-axis current control stage when the reading is greater than the first threshold but less than a preset second threshold; initiating the negative Q-axis current control stage when the reading is greater than the second threshold but less than a preset third threshold; and initiating the D-axis current control stage when the reading is greater than the third threshold but less than a preset fourth threshold.

Optionally, the initial phase obtaining step in the method includes calculating, based on the second displacement data, the fourth displacement data and the encoder's CPR, a position corresponding to the line bisecting the minimum included angle defined by a position corresponding to the second displacement data and a position corresponding to the fourth displacement data.

Optionally, the initial phase obtaining step in the method includes calculating a second difference between the second displacement data and the fourth displacement data; comparing the second difference, separately, with the positive value of half of the encoder's CPR and the negative value of half of the encoder's CPR; if the second difference is greater than the negative value but less than the positive value of half of the encoder's CPR, then the initial phase is a first average value between the second displacement data and the fourth displacement data; if the second difference is both less than zero and less than the negative value of half of the encoder's CPR, then use a difference between the encoder's CPR and the fourth displacement data as fifth displacement data; calculating a second average value between the fifth displacement data and the second displacement data; if the fifth displacement data are greater than the second displacement data, then the initial phase is a sum of the second average value and the fourth displacement data; if the fifth displacement data are less than or equal to the second displacement data, then the initial phase is a difference between the second displacement data and the second average value; if the second difference is both greater than zero and greater than the positive value of half of the encoder's CPR, then use the difference between the encoder's CPR and the second displacement data as sixth displacement data; and calculating a third average value between the sixth displacement data and the fourth displacement data; if the sixth displacement data are greater than the fourth displacement data, then the initial phase is a sum of the third average value and the second displacement data; and if the sixth displacement data are less than or equal to the fourth displacement data, then the initial phase is a difference between the fourth displacement data and the third average value.

Embodiments of this invention further provide a system for controlling a permanent-magnet synchronous motor, comprising a control unit, a motor to be detected and an encoder. The control unit is electrically connected with a rotor of the motor and to the encoder. The rotor is coaxially connected with the encoder. The control unit, through the encoder, sequentially acquires first displacement data which register the encoder's reading when the rotor spins to a Q-axis, second displacement data which register the encoder's reading when the rotor spins from the Q-axis to a D-axis, third displacement data which register the encoder's reading when the rotor spins from the D-axis to a negative Q-axis and fourth displacement data which register the encoder's reading when the rotor spins from the negative Q-axis to the D-axis. The control unit obtains an initial phase of the motor based on the second displacement data, the fourth displacement data and the encoder's CPR, and determines a phase sequence of the motor based on the first displacement data, the second displacement data and the encoder's CPR.

Optionally, the control unit in the system is specifically configured for detecting, based on the first displacement data, the second displacement data and the encoder's CPR, whether a first rotation direction of the rotor rotating from a zero point of the encoder to a position corresponding to the first displacement data is the same as a second rotation direction from the position corresponding to the first displacement data to a position corresponding to the second displacement data; if not the same, then the motor is wired in a positive phase sequence; and if the same, the motor is wired in a negative phase sequence.

Optionally, the control unit in the system is specifically configured for calculating a first difference between the first displacement data and the second displacement data; and comparing the first difference with a positive or negative value of half of the encoder's CPR; if the first difference is greater than zero but less than the positive value of half of the encoder's CPR, then the motor is wired in the positive phase sequence; if the first difference is both less than zero and less than the negative value of half of the encoder's CPR, then the motor is wired in a positive phase sequence; if the first difference is less than zero but greater than the negative value of half of the encoder's CPR, then the motor is wired in a negative phase sequence; and if the first difference is both greater than zero and greater than the positive value of half of the encoder's CPR, then the motor is wired in a negative phase sequence.

Optionally, the control unit in the system comprises a CPU and a memory.

The CPU initiates a Q-axis current control stage for moving the rotor towards the Q-axis, and acquires the first displacement data through the encoder and stores them in the memory when the rotor arrives at the Q-axis.

The CPU initiates a D-axis current control stage for moving the rotor towards the D-axis, and acquires the second displacement data through the encoder and stores them in the memory when the rotor arrives at the D-axis.

The CPU initiates a negative Q-axis current control stage for moving the rotor towards the negative Q-axis, and acquires the third displacement data through the encoder and stores them in the memory when the rotor arrives at the negative Q-axis.

The CPU initiates the D-axis current control stage for moving the rotor towards the D-axis, and acquires the fourth displacement data through the encoder and stores them in the memory when the rotor arrives at the D-axis.

Optionally, the control unit in the system is specifically configured for calculating, based on the second displacement data, the fourth displacement data and the encoder's CPR, a position corresponding to the line bisecting the minimum included angle defined by a position corresponding to the second displacement data and a position corresponding to the fourth displacement data, to obtain the initial phase.

Optionally, the control unit in the system is specifically configured for calculating a second difference between the second displacement data and the fourth displacement data; comparing the second difference, separately, with the positive value of half of the encoder's CPR and the negative value of half of the encoder's CPR; if the second difference is greater than the negative value but less than the positive value of half of the encoder's CPR, then the initial phase is a first average value between the second displacement data and the fourth displacement data; if the second difference is both less than zero and less than the negative value of half of the encoder's CPR, then use the difference between the encoder's CPR and the fourth displacement data as fifth displacement data; calculating a second average value between the fifth displacement data and the second displacement data; if the fifth displacement data are greater than the second displacement data, then the initial phase is a sum of the second average value and the fourth displacement data; if the fifth displacement data are less than or equal to the second displacement data, then the initial phase is a difference between the second displacement data and the second average value; if the second difference is both greater than zero and greater than the positive value of half of the encoder's CPR, then use the difference between the encoder's CPR and the second displacement data as sixth displacement data; calculating a third average value between the sixth displacement data and the fourth displacement data; if the sixth displacement data are greater than the fourth displacement data, then the initial phase is a sum of the third average value and the second displacement data; and if the sixth displacement data are less than or equal to the fourth displacement data, then the initial phase is a difference between the fourth displacement data and the third average value.

A method for detecting motor initial phase and phase sequence provided by this invention acquires through an encoder the following displacement data sequentially: first displacement data which register the encoder's reading when the rotor spins to a Q-axis, second displacement data which register the encoder's reading when the rotor spins from the Q-axis to a D-axis, third displacement data which register the encoder's reading when the rotor spins from the D-axis to a negative Q-axis and fourth displacement data which register the encoder's reading when the rotor spins from the negative Q-axis to the D-axis; and then determines the initial phase of the motor based on the comparison result among the second displacement data, the fourth displacement data and the encoder's CPR. Meanwhile, the phase sequence of the motor can be determined based on the first displacement data, the second displacement data and the encoder's CPR. That is to say, the method can not only automatically detect an initial phase of the rotor, but also automatically detect a wiring phase sequence of the motor, and overcome the influence of friction force by averaging the leftward and rightward movement on the D-axis to improve the initial phase detection precision.

To clearly illustrate the objects, features and advantages of this invention mentioned hereinabove, the optional embodiments with accompanying drawings are described in detail hereinafter.

BRIEF DESCRIPTION OF FIGURES

Hereinafter is given a brief introduction to the drawings required in embodiments to clearly describe the technical solutions in the embodiments of the present invention. It should be understood that the following drawings only show some embodiments of the invention, and therefore should not be construed as a limit to the scope. For those of ordinary skill in the art, other related drawings can be obtained from these drawings without creative work.

Figure 1:
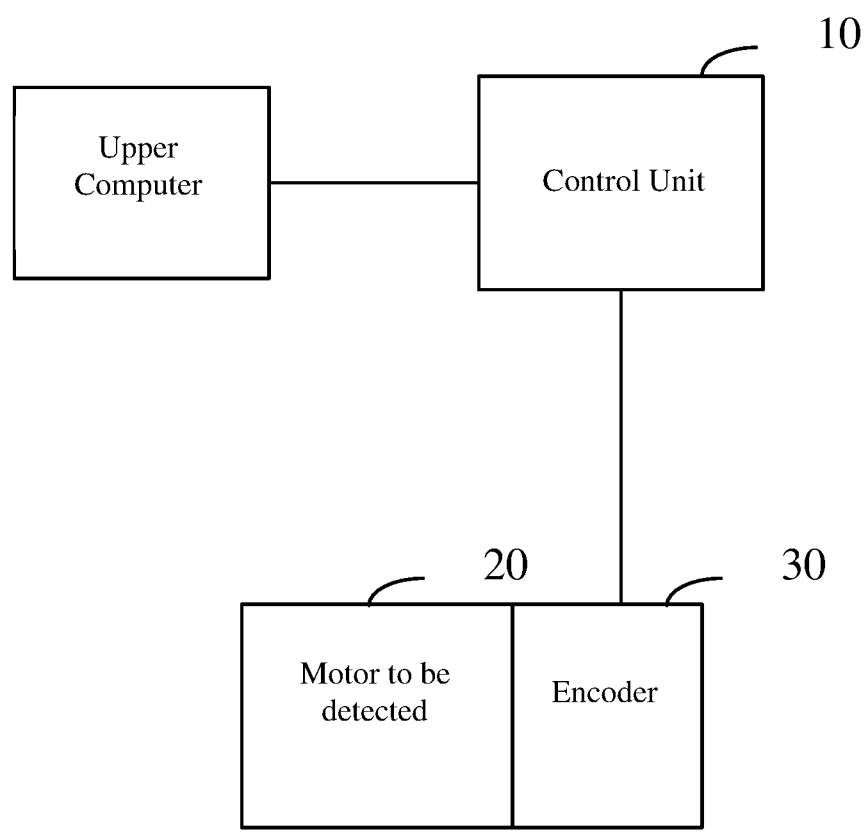
FIG. 1 shows a schematic diagram of a system for controlling a permanent-magnet synchronous motor provided by an embodiment of this invention.

Reference signs: 100-system for controlling a permanent-magnet synchronous motor; 10-control unit; 20-motor to be detected; 30-encoder

DETAILED DESCRIPTION OF THE EMBODIMENTS

Hereinafter the technical solutions in embodiments of the present invention will be clearly and completely described in conjunction with the accompanying drawings in the embodiments of the invention. It is obvious that the embodiments described herein are only part rather than all of the embodiments of the invention. In general, the components of the embodiments of the invention described and shown in the drawings herein may be arranged and designed in various different configurations. Therefore, the detailed description of the embodiments of the invention provided in the drawings hereinafter is not intended to limit the scope of the claimed invention, but only represents selected embodiments of the invention. Based on the embodiments of the invention, all the other embodiments obtained by those skilled in the art without creative work fall within the protection scope of this invention.

For a system for controlling a permanent-magnet synchronous motor, both the initial phase sequence and the initial phase of a rotor are important status parameters to be known. On many occasions, for normal control, a motor needs to be wired in a UVW phase sequence. Usually, manual setting is performed to ensure an accurate phase sequence while automatic setting cannot be achieved. Once an error occurs, harm to related operators will be done during the operation of the motor, and at the same time the existing motor control systems have no phase sequence detection function. In addition, many existing motor control systems fail to accurately detect the initial phase of a rotor, but the accurate acquisition of the initial phase of the rotor is critical to the torque performance of the motor.

In related arts, the following methods are usually employed to obtain an initial phase sequence:

1. Applying a pulse voltage at a given angle and measuring current $I_D$ and $I_Q$ to analyze the initial phase. The shortcomings of this method are manifested by low precision of 7.5°, uncontrollable voltage, no counter electromotive force because the motor is kept stationary as much as possible, and overcurrent which will cause an initial phase detection failure.

2. Determining the initial phase by the corresponding relationship between a phase current variation rate and an angle. The shortcomings of this method lie in complicated calculation and use of parameters such as inductance of the motor which will change along with variation in frequency and temperature during operation.

3. Directly applying a voltage for moving to the initial position. The shortcomings of this method include high voltage step impact and vibration for a certain period before stabilization after arriving in place, and this method will fail if the position is opposite to the D-axis accidentally.

4. Giving a virtual angle to measure the initial position. The shortcomings of this method lie in complex implementation and the need to consider the influence of friction force to make the motor move slightly.

As a result, embodiments of the present invention provide a method for detecting motor initial phase and phase sequence and a system for controlling a permanent-magnet synchronous motor, so as to solve these problems.

It should be noted that similar signs and letters represent similar items in the drawings hereinafter. Once an item is defined in a drawing, no further definition or explanation is required in the subsequent drawings. Meanwhile, the terms such as first and second are only used for distinguishing description and should not be interpreted as indicating or implying relative importance in the description of the invention.

EXAMPLE 1

FIG. 1 is a schematic diagram of a system for controlling a permanent-magnet synchronous motor provided by an embodiment of this invention. As shown in FIG. 1, the system comprises a control unit 10, a motor to be detected 20 and an encoder 30. The control unit 10 is electrically connected with the encoder 30. The encoder 30 sends the acquired data via protocol transmission to the control unit for processing. A rotor of the motor 20 is connected to the encoder 30. Optionally, the rotor is coaxially connected with the encoder 30 which can record the displacement information of the rotor. The control unit 10 is also electrically connected with the rotor.

In the example, the encoder 30 is a component capable of detecting and outputting the current rotation position of the rotor. For example, it can be, but not limited to, a rotary transformer, an incremental encoder, an absolute encoder, a sine-cosine encoder, a grating ruler, etc.

In the example of the invention, the control unit 10, through the encoder 30, separately acquires first displacement data which register the encoder's reading when the rotor spins to a Q-axis, second displacement data which register the encoder's reading when the rotor spins from the Q-axis to a D-axis, third displacement data which register the encoder's reading when the rotor spins from the D-axis to a negative Q-axis and fourth displacement data which register the encoder's reading when the rotor spins from the negative Q-axis to the D-axis. The control unit 10 obtains the initial phase of the motor 20 based on the second displacement data, the fourth displacement data and the CPR of the encoder 30, and determines the phase sequence of the motor 20 based on the first displacement data, the second displacement data and the CPR of the encoder 30.

It should be noted that the motor 20 may be a permanent-magnet synchronous motor. The Q-axis and the D-axis refer to a quadrature axis and a direct axis of the permanent magnet synchronous motor, respectively.

In the example, it can be detected, based on the first displacement data, the second displacement data and the CPR of the encoder 30, whether a first rotation direction of the rotor rotating from a zero point of the encoder to a position corresponding to the first displacement data is the same as a second rotation direction from the position corresponding to the first displacement data to a position corresponding to the second displacement data. If they are different, then the motor 20 is wired in a positive phase sequence; and if they are the same, then the motor 20 is wired in a negative phase sequence.

Optionally, the control unit 10 can calculate a first difference between the first displacement data and the second displacement data; and compare the first difference with a positive or negative value of half of the CPR of the encoder 30. If the first difference is greater than zero but less than the positive value of half of the CPR of the encoder 30, then the motor 20 is wired in a positive phase sequence; if the first difference is both less than zero and less than the negative value of half of the CPR of the encoder 30, then the motor 20 is wired in a positive phase sequence; if the first difference is less than zero but greater than the negative value of half of the CPR of the encoder 30, then the motor 20 is wired in a negative phase sequence; and if the first difference is both greater than zero and greater than the positive value of half of the encoder's CPR, then the motor 20 is wired in a negative phase sequence.

In the example of the invention, the control unit 10 comprises a central processing unit (CPU) and a memory. The CPU is electrically connected with the rotor and the encoder 30. The memory is electrically connected with the CPU. The CPU initiates a Q-axis current control stage for moving the rotor towards a Q-axis. The CPU receives the first displacement data acquired through the encoder 30 and stores them in the memory when the rotor arrives at the Q-axis. The CPU initiates a D-axis current control stage for moving the rotor towards a D-axis. The CPU receives the second displacement data acquired through the encoder 30 and stores them in the memory when the rotor arrives at the D-axis. The CPU initiates a negative Q-axis current control stage for moving the rotor towards a negative Q-axis. The CPU receives the third displacement data acquired through the encoder 30 and stores them in the memory when the rotor arrives at the negative Q-axis. The CPU initiates the D-axis current control stage for moving the rotor towards the D-axis. The CPU receives the fourth displacement data acquired through the encoder 30 and stores them in the memory when the rotor arrives at the D-axis.

EXAMPLE 2

Figure 2:
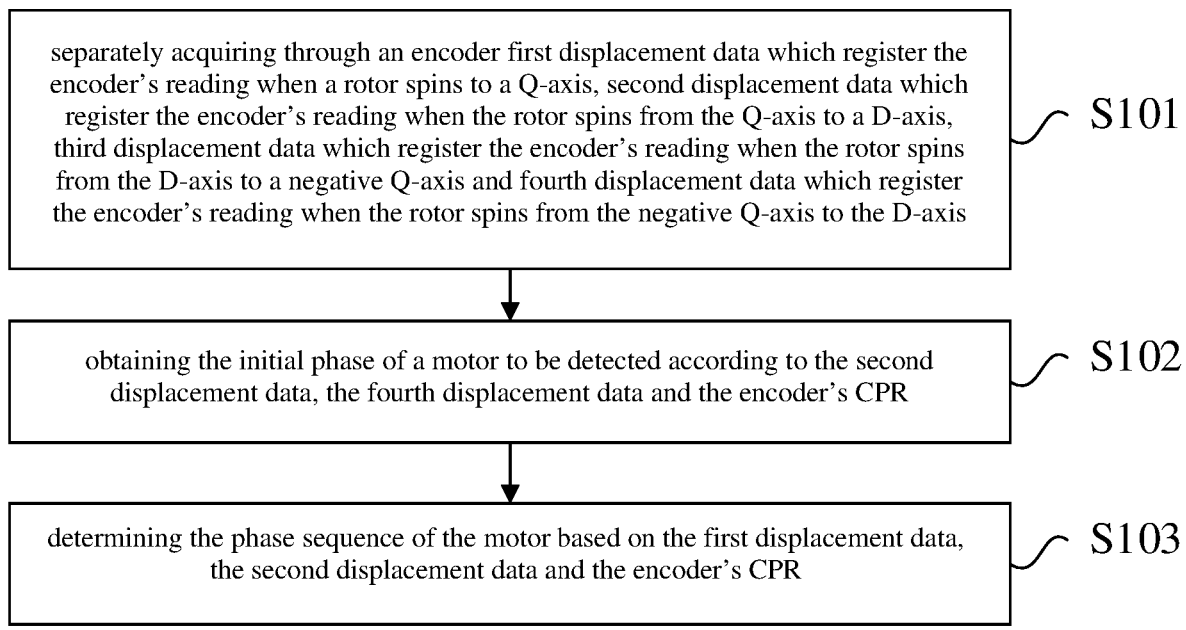
FIG. 2 shows a flow chart of the steps of a method for detecting motor initial phase and phase sequence provided by an embodiment of this invention.

FIG. 2 is a flow chart of the steps of a method for detecting motor initial phase and phase sequence provided by an embodiment of this invention. The method is applied to the system for controlling a permanent-magnet synchronous motor mentioned hereinabove, and aims to automatically and accurately detect the initial phase and the phase sequence of the system.

As shown in FIG. 2, the method comprises the following steps:

S101: separately acquiring, through an encoder 30, first displacement data which register the encoder's reading when the rotor spins to a Q-axis, second displacement data which register the encoder's reading when the rotor spins from the Q-axis to a D-axis, third displacement data which register the encoder's reading when the rotor spins from the D-axis to a negative Q-axis and fourth displacement data which register the encoder's reading when the rotor spins from the negative Q-axis to the D-axis.

Figure 3:
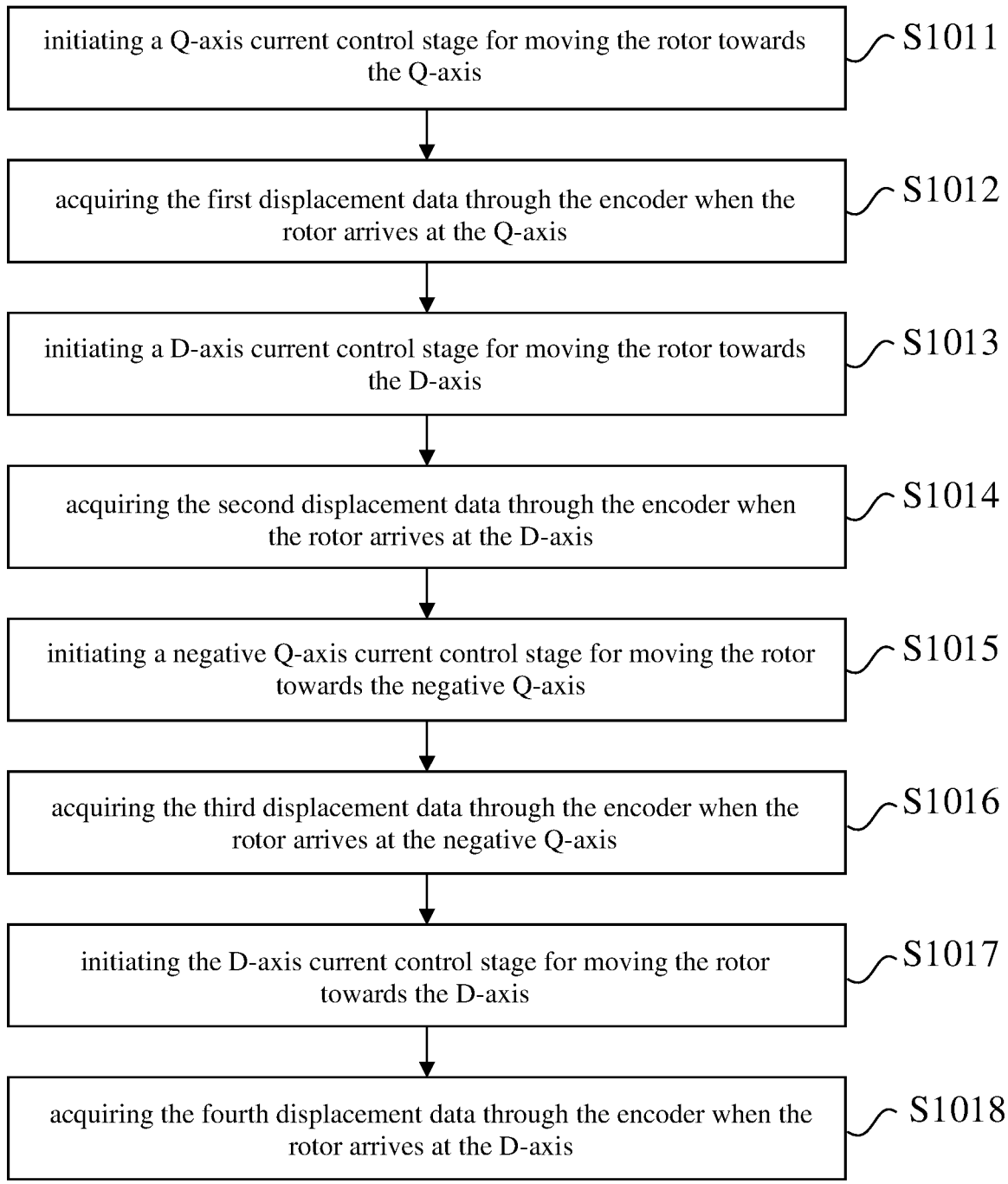
FIG. 3 is a flow chart of the sub-steps of the step S101 in FIG. 2.

In the example of the invention, as shown in FIG. 3, the step S101 includes the following sub-steps:

S1011: initiating a Q-axis current control stage for moving the rotor towards the Q-axis.

In the example of the invention, the Q-axis current control stage is initiated by executing a closed-loop Q-axis current instruction in a current closed-loop control mode. Preferably, the Q-axis current instruction is a ramp current signal. By way of a closed current loop, the Q-axis current instruction (i.e., $I_Q$) has its control quantity slowly increasing in the manner of ramp to prevent step impact and keep insusceptible to motor parameters. The maximum threshold of $I_Q$ (which can be set differently according to different power sections) is set.

S1012: acquiring the first displacement data through the encoder 30 when the rotor arrives at the Q-axis.

In the example of the invention, the encoder 30 records the first displacement data corresponding to rotation of the rotor from an initial position to the Q-axis.

S1013: initiating a D-axis current control stage for moving the rotor towards the D-axis.

In the example of the invention, the D-axis current control stage is initiated by executing a closed-loop D-axis current instruction in a current closed-loop control mode. Preferably, the D-axis current instruction is a ramp current signal. By way of a closed current loop, the D-axis current instruction (i.e., $I_D$) has its control quantity slowly increasing in the manner of ramp to prevent step impact and keep insusceptible to motor parameters. The maximum threshold of $I_D$ (which can be set differently according to different power sections) is set.

S1014: acquiring the second displacement data through the encoder 30 when the rotor arrives at the D-axis.

In the example of the invention, the encoder 30 records the second displacement data corresponding to rotation of the rotor from the Q-axis to the D-axis.

S1015: initiating a –Q-axis current control stage for moving the rotor towards the negative Q-axis.

In the example of the invention, the negative Q-axis current control stage is initiated by executing a closed-loop negative Q-axis current instruction in a current closed-loop control mode. Preferably, the negative Q-axis current instruction is a ramp current signal. By way of a closed current loop, the negative Q-axis current instruction (i.e., $-I_Q$) has its control quantity slowly increasing in the manner of ramp to prevent step impact and keep insusceptible to motor parameters. The maximum threshold of $-I_Q$ (which can be set differently according to different power sections) is set.

S1016: acquiring the third displacement data through the encoder 30 when the rotor arrives at the –Q-axis.

In the example of the invention, the encoder 30 records the third displacement data corresponding to rotation of the rotor from the D-axis to the negative Q-axis.

S1017: initiating the D-axis current control stage for moving the rotor towards the D-axis.

In the example of the invention, the closed-loop D-axis current instruction is executed again in the current closed-loop control mode, so as to move the rotor towards the D-axis.

S1018: acquiring the fourth displacement data through the encoder 30 when the rotor arrives at the D-axis.

In the example of the invention, the encoder 30 records the fourth displacement data corresponding to rotation of the rotor from the negative Q-axis to the D-axis.

Further, before S101, the method for detecting motor initial phase and phase sequence provided by the example of the invention may also comprise initiating a motor initial phase detection mode in response to user operation. Specifically, a user set mode is acquired, and then the motor initial phase detection mode is initiated. After related software for motor initial phase and phase sequence detection is enabled to run, timing is started so as to initiate a corresponding current control stage when a reading meets preset conditions, wherein the current control stage includes the Q-axis current control stage, the D-axis current control stage, and the negative Q-axis current control stage. That is to say, each current control stage is initiated in sequence under control according to the reading, to thereby realize accurate control.

S102: obtaining the initial phase of the motor 20 based on the second displacement data, the fourth displacement data and the encoder's CPR.

In one embodiment, the initial phase of the motor 20 can be obtained according to the second displacement data, the fourth displacement data and half of the encoder's CPR. In this example, the initial phase is obtained by calculating, based on the second displacement data, the fourth displacement data and the encoder's CPR, a position corresponding to the line bisecting the minimum included angle defined by a position corresponding to the second displacement data and a position corresponding to the fourth displacement data.

Specifically, a second difference between the second displacement data and the fourth displacement data is calculated and compared with a positive and a negative value of half of the encoder's CPR.

Figure 4:
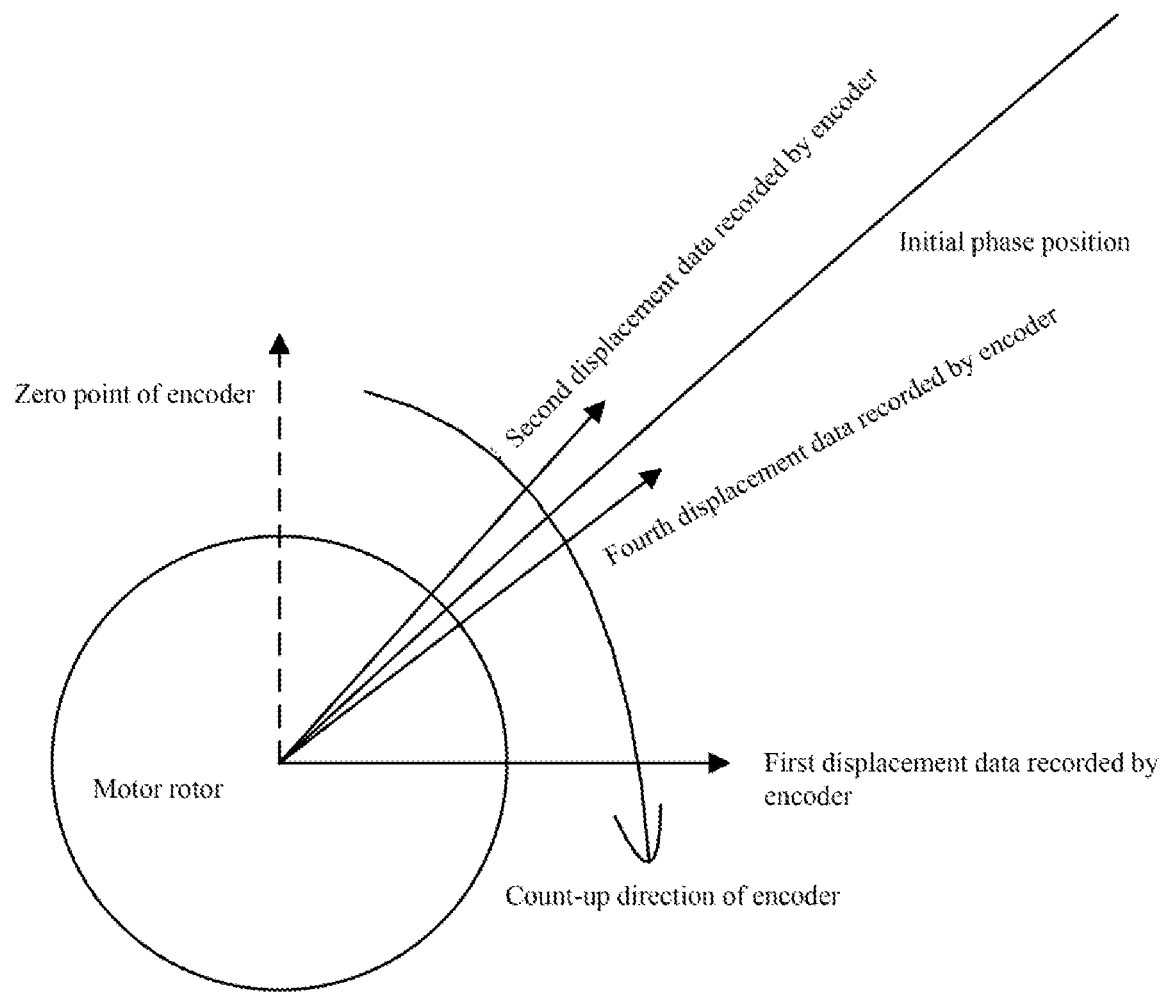
FIG. 4 shows a first one of the principle diagrams for determining an initial phase provided by an embodiment of this invention.

If the second difference is greater than the negative value of half of the encoder's CPR but less than the positive value of half of the encoder's CPR, then the initial phase is a first average value between the second displacement data and the fourth displacement data as shown in FIG. 4. It should be understood that it is actually very small between the second displacement data and the fourth displacement data as marked in FIG. 4.

Figure 5:
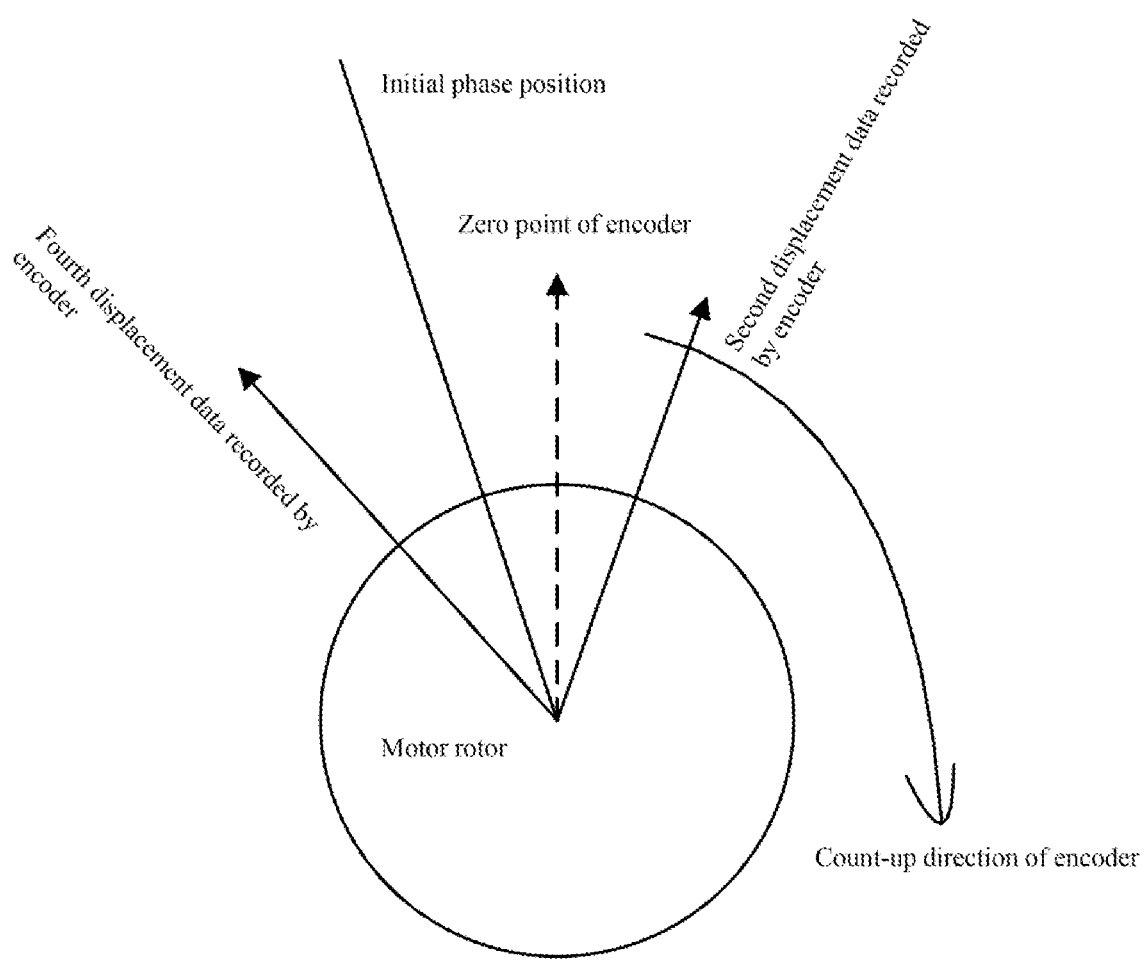
FIG. 5 shows a second one of the principle diagrams for determining an initial phase provided by an embodiment of this invention.

However, if the second difference falls beyond the threshold interval defined by the negative value of half of the encoder's CPR and the positive value of half of the encoder's CPR, it means overturn of the encoder 30. When the overturn problem occurs, the following situations may be involved. For the convenience of description, take FIGS. 5-8 as examples:

1. As shown in FIG. 5, if the second difference is both less than zero and less than the negative value of half of the encoder's CPR and at the same time the fourth displacement data are farther from the zero point of the encoder than the second displacement data, then a difference between the encoder's CPR and the fourth displacement data can be used as fifth displacement data. A second average value between the fifth displacement data and the second displacement data is calculated, and a sum of the second average value and the fourth displacement data is used as the initial phase. It should be noted that the fourth displacement data are farther from the zero point of the encoder than the second displacement data when the fifth displacement data are greater than the second displacement data.

Figure 6:
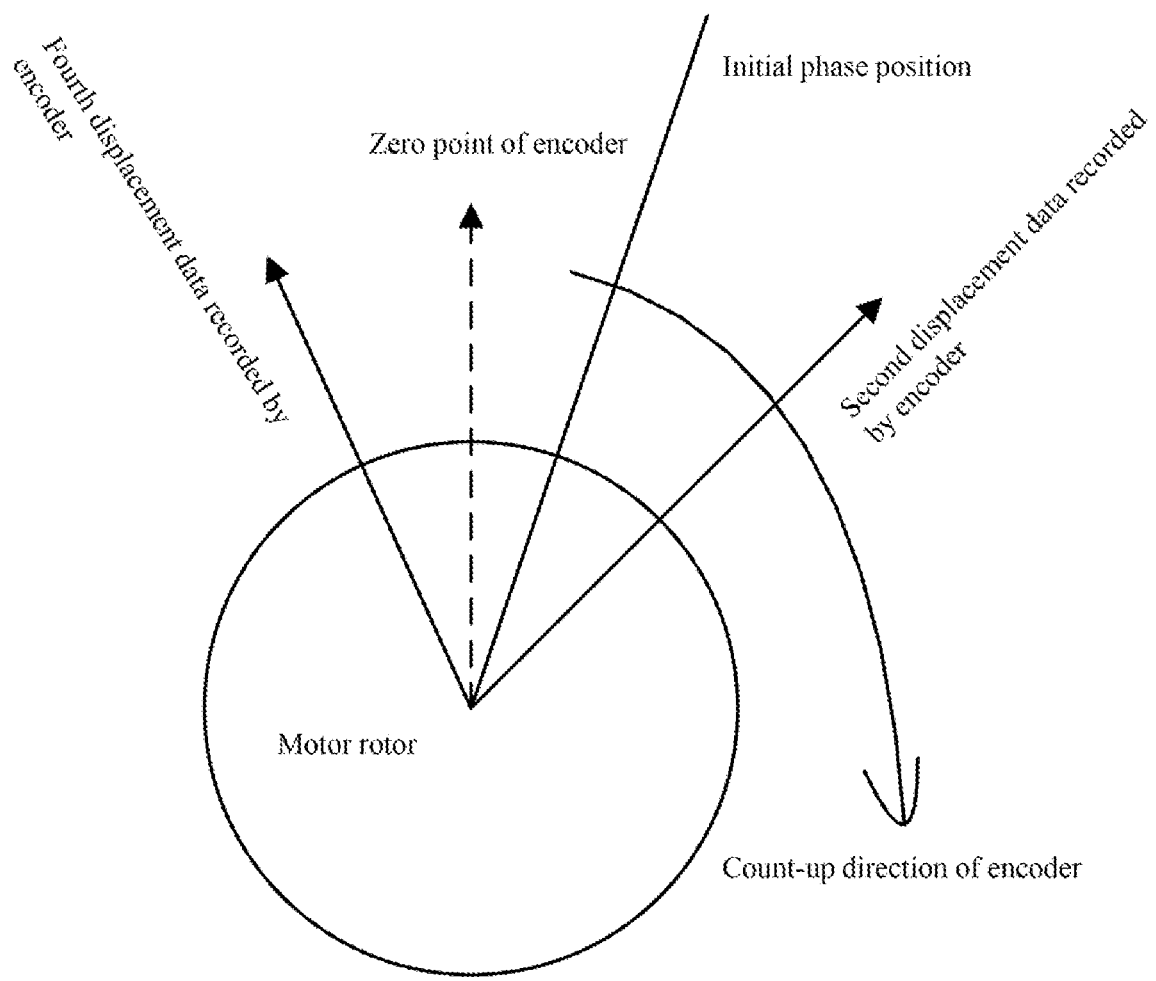
FIG. 6 shows a third one of the principle diagrams for determining an initial phase provided by an embodiment of this invention.

2. As shown in FIG. 6, if the second difference is both less than zero and less than the negative value of half of the encoder's CPR and at the same time the fourth displacement data are closer to the zero point of the encoder than the second displacement data, then a difference between the encoder's CPR and the fourth displacement data can be used as fifth displacement data. A second average value between the fifth displacement data and the second displacement data is calculated, and a difference between the second displacement data and the second average value is used as the initial phase. It should be noted that the fourth displacement data are closer to the zero point of the encoder than the second displacement data when the fifth displacement data are less than or equal to the second displacement data.

Figure 7:
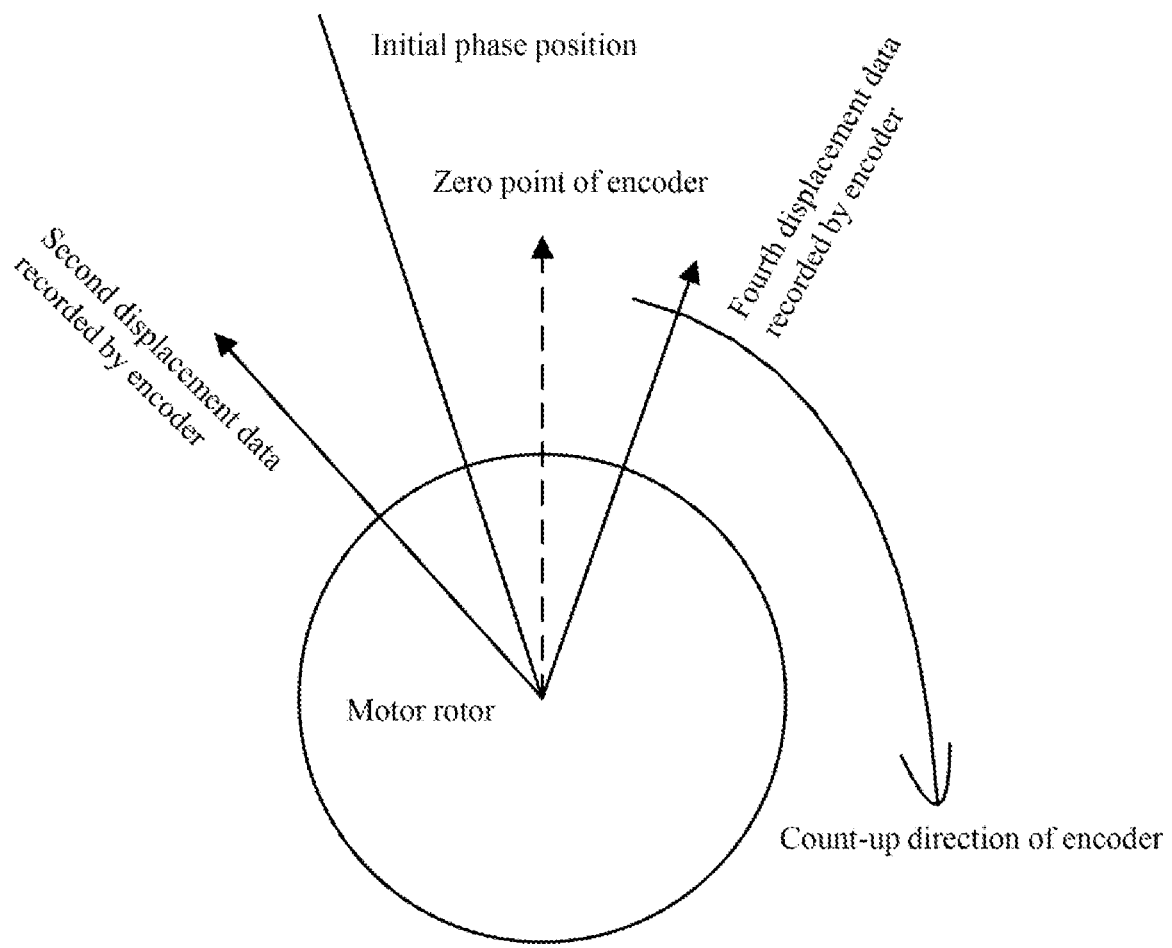
FIG. 7 shows a fourth one of the principle diagrams for determining an initial phase provided by an embodiment of this invention.

3. As shown in FIG. 7, if the second difference is both greater than zero and greater than the positive value of half of the encoder's CPR and at the same time the second displacement data are farther from the zero point of the encoder than the fourth displacement data, then a difference between the encoder's CPR and the second displacement data can be used as sixth displacement data. A third average value between the sixth displacement data and the fourth displacement data is calculated, and a sum of the third average value and the second displacement data is used as the initial phase. It should be noted that the second displacement data are farther from the zero point of the encoder than the fourth displacement data when the sixth displacement data are greater than the fourth displacement data.

Figure 8:
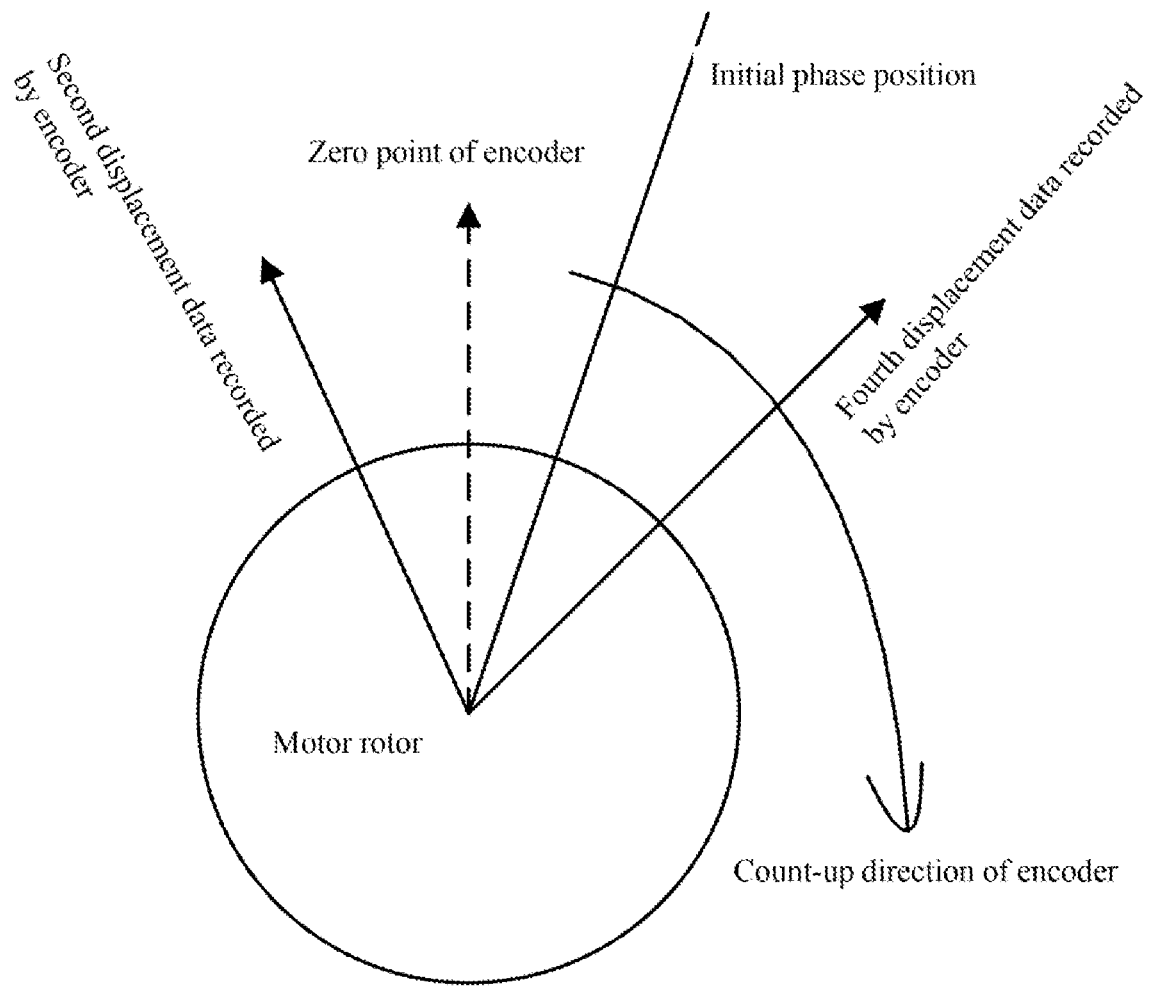
FIG. 8 shows a fifth one of the principle diagrams for determining an initial phase provided by an embodiment of this invention.

4. As shown in FIG. 8, if the second difference is both greater than zero and greater than the positive value of half of the encoder's CPR and at the same time the second displacement data are closer to the zero point of the encoder than the fourth displacement data, a difference between the encoder's CPR and the second displacement data can be used as sixth displacement data. A third average value between the sixth displacement data and the fourth displacement data is calculated, and a difference between the fourth displacement data and the third average value is the initial phase. It should be noted that the second displacement data are closer to the zero point of the encoder than the fourth displacement data when the sixth displacement data are less than or equal to the fourth displacement data.

S103: determining the phase sequence of the motor 20 based on the first displacement data, the second displacement data and the encoder's CPR.

In the example of the invention, a first difference between the first displacement data and the second displacement data is calculated and compared with the positive or negative value of half of the encoder's CPR. If the first difference is greater than zero but less than the positive value of half of the encoder's CPR, then the motor 20 is wired in a positive phase sequence (e.g. UVW phase sequence). If the first difference is both less than zero and less than the negative value of half of the encoder's CPR, then the motor 20 is wired in the positive phase sequence. If the first difference is less than zero but greater than the negative value of half of the encoder's CPR, then the motor 20 is wired in a negative phase sequence (e.g. UWV phase sequence). If the first difference is both greater than zero and greater than the positive value of half of the encoder's CPR, then the motor 20 is wired in the negative phase sequence.

In conclusion, the present invention provides a method for detecting motor initial phase and phase sequence and a system for controlling a permanent-magnet synchronous motor. The method is applied to the system which comprises a motor to be detected and an encoder. A rotor of the motor is coaxially connected with the encoder. The method comprises separately acquiring, through the encoder, first displacement data which register the encoder's reading when the rotor spins to a Q-axis, second displacement data which register the encoder's reading when the rotor spins from the Q-axis to a D-axis, third displacement data which register the encoder's reading when the rotor spins from the D-axis to a negative Q-axis and fourth displacement data which register the encoder's reading when the rotor spins from the negative Q-axis to the D-axis; obtaining the initial phase of motor based on the second displacement data, the fourth displacement data and the encoder's CPR; and determining the phase sequence of the motor based on the first displacement data, the second displacement data and the encoder's CPR. That is to say, the method can not only automatically detect the initial phase of the rotor, but also the motor wiring phase sequence, and overcome the influence of friction force by averaging the leftward and rightward movement on the D-axis to improve the initial phase detection precision and enable the motor to exert its maximum torque performance.

In the embodiments provided by the invention, it should be understood that embodiments described hereinabove are only illustrative. For example, the flow charts and the block diagrams in the accompanying drawings show the possible implementations of system architectures, functions and operations of the devices, methods and computer program products according to the multiple embodiments of the invention. At this point, each box in the flow charts or block diagrams can represent part of a module, program segment or code. The part of a module, program segment or code comprises one or more executable instructions for realizing specified logic functions. It should also be noted that, in some implementations as replacement, the functions provided in the boxes may follow a sequence different from that provided in the drawings. For example, two consecutive boxes can actually be performed concurrently basically, or sometimes performed in a reverse sequence, depending on the functions concerned. It should also be noted that each box in the flow charts and/or block diagrams and the combination of the boxes in the flow charts and/or block diagrams can be implemented by a special hardware-based system executing specified functions and actions, or by a combination of special hardware and computer instructions.

In addition, each functional module in each embodiment of the invention may be integrated to form an independent part, or exist alone, or two or more modules may be integrated to form an independent part.

If the functions are implemented in the form of software functional modules and for sale or use as independent products, they can be stored in a computer readable storage medium. Based on this, the technical solutions of the invention essentially or part of the invention contributing to the prior arts or part of the technical solutions can be embodied in the form of software products. The computer software products are stored in a storage medium and comprise a number of instructions for enabling a piece of computer equipment (such as personal computer, server and network equipment) to execute all or part of the steps of the method in each embodiment of the invention. The storage medium comprises various media capable of storing program codes, such as USB flash disk, mobile hard disk drive, read-only-memory (ROM), random access memory (RAM), magnetic disk and optical disk.

It should be noted that relation-describing terms such as first and second are only used for distinguishing one entity or operation from another entity or operation, and do not necessarily require or imply any such actual relation or sequence between these entities or operations herein. Moreover, the terms such as "comprise", "include" or any other variant thereof are intended to cover non-exclusive inclusion, so that a process, method, object or equipment including a series of elements not only includes those elements, but also includes other elements not listed explicitly, or further includes the inherent elements of the process, method, object or equipment. Under the condition of no further limitations, the element defined by the sentence "include a/an . . . " does not exclude the presence of other identical elements in the process, method, object or equipment including this element.

Hereinabove mentioned are only preferred embodiments of the present invention, which are not used for limiting the invention. For those skilled in the art, various modifications and changes can be made on the invention. Within the spirit and principle of the invention, any modification, equivalent replacement, improvement, etc. should be included in the protection scope of the invention. It should be noted that similar reference numbers and letters represent similar items in the following drawings. As a result, once an item is defined in a drawing, no further definition or explanation is required in the subsequent drawings.

Hereinabove mentioned are only the specific embodiments of the present invention, and the protection scope of the present invention is not limited thereto. Anyone skilled in the art can easily come up with modifications or replacements within the technical scope disclosed by the present invention, and these modifications or replacements should be covered within the protection scope of the present invention. Therefore, the protection scope of the present invention should be subject to the protection scope of the claims.

INDUSTRIAL APPLICATION

A method for detecting motor initial phase and phase sequence provided by the present invention sequentially acquires, through an encoder, first displacement data which register the encoder's reading when the rotor spins to a Q-axis, second displacement data which register the encoder's reading when the rotor spins from the Q-axis to a D-axis, third displacement data which register the encoder's reading when the rotor spins from the D-axis to a negative Q-axis and fourth displacement data which register the encoder's reading when the rotor spins from the negative Q-axis to the D-axis; determines the initial phase of a motor to be detected based on comparison results among the second displacement data, the fourth displacement data and the encoder's CPR; and at the same time determines the phase sequence of the motor based on the first displacement data, the second displacement data and the encoder's CPR. That is to say, the method can not only automatically detect the initial phase of the rotor, but also the motor wiring phase sequence, and overcome the influence of friction force by averaging the leftward and rightward movement on the D-axis to improve the initial phase detection precision.

What is claimed is:

1. A method for detecting an initial phase and a phase sequence in a permanent magnet synchronous motor control system comprising a motor to be detected and an encoder coaxially connected to a rotor of the motor, comprising the steps of:
   acquiring through the encoder the following displacement data of the rotor sequentially:
      first displacement data which register the rotor's position at a Q-axis after the rotor spins from an initial position to the Q-axis;
      second displacement data which register the rotor's position at a D-axis after the rotor spins from the Q-axis to the D-axis;
      third displacement data which register the rotor's position at a negative Q-axis after the rotor spins from the D-axis to the negative Q-axis; and
      fourth displacement data which register the rotor's position at the D-axis after the rotor spins from the negative Q-axis to the D-axis;
   obtaining the initial phase of the motor based on the second displacement data, the fourth displacement data and the encoder's CPR (counts per revolution); and
   determining phase sequence of the motor based on the first displacement data, the second displacement data and the encoder's CPR.

2. The method in claim 1, wherein the determining step includes:
   calculating a first difference between the first displacement data and the second displacement data;
   comparing the first difference with a positive or negative value of half of the encoder's CPR; and
   determining the phase sequence of the motor based on an outcome of the comparing step.

3. The method in claim 2, wherein:
   if the first difference is greater than zero but less than the positive value of half of the encoder's CPR, then the motor is wired in a positive phase sequence;
   if the first difference is both less than zero and less than the negative value of half of the encoder's CPR, then motor is wired in a positive phase sequence;
   if the first difference is less than zero but greater than the negative value of half of the encoder's CPR, then motor is wired in a negative phase sequence; and
   if the first difference is both greater than zero and greater than the positive value of half of the encoder's CPR, then motor is wired in a negative phase sequence.

4. The method in claim 3, wherein the acquiring step includes:
   initiating a Q-axis current control stage for moving the rotor towards the Q-axis;
   acquiring the first displacement data through the encoder when the rotor arrives at the Q-axis;
   initiating a D-axis current control stage for moving the rotor towards the D-axis;
   acquiring the second displacement data through the encoder when the rotor arrives at the D-axis;
   initiating a negative Q-axis current control stage for moving the rotor towards the negative Q-axis;
   acquiring the third displacement data through the encoder when the rotor arrives at the negative Q-axis;
   initiating the D-axis current control stage for moving the rotor towards the D-axis; and
   acquiring the fourth displacement data through the encoder when the rotor arrives at the D-axis.

5. The method in claim 4, wherein:
   the Q-axis current control stage is initiated by executing a closed-loop Q-axis current instruction in a current closed-loop control mode;
   the Q-axis current instruction is a ramp current signal;
   the D-axis current control stage is initiated by executing a closed-loop D-axis current instruction in a current closed-loop control mode;
   the D-axis current instruction is a ramp current signal;
   the negative Q-axis current control stage is initiated by executing a closed-loop negative Q-axis current instruction in a current closed-loop control mode; and
   the negative Q-axis current instruction is a ramp current signal.

6. The method in claim 4, further comprising the steps of:
   initiating an initial phase detection mode in response to user operation; and
   starting a time counter for initiating a corresponding current control stage when the time counter's reading meets preset conditions, wherein the current control stage includes the Q-axis current control stage, the D-axis current control stage and the negative Q-axis current control stage.

7. The method in claim 6, wherein the starting step includes:
   initiating the Q-axis current control stage when the reading is less than a first preset threshold;
   initiating the D-axis current control stage when the reading is greater than the first preset threshold but less than a second preset threshold;
   initiating the negative Q-axis current control stage when the reading is greater than the second preset threshold but less than a third preset threshold; and
   initiating the D-axis current control stage when the reading is greater than the third preset threshold but less than a fourth preset threshold.

8. The method in claim 1, wherein the obtaining step includes the following step for obtaining the initial phase:
   calculating, based on the second displacement data, the fourth displacement data and the encoder's CPR, a position corresponding to a line bisecting the minimum included angle defined by a position corresponding to the second displacement data and a position corresponding to the fourth displacement data.

9. The method in claim 8, wherein the obtaining step further includes:
   calculating a second difference between the second displacement data and the fourth displacement data;
   comparing the second difference, separately, with a positive value of half of the encoder's CPR and with a negative value of half of the encoder's CPR;
   if the second difference is greater than the negative value of half of the encoder's CPR but less than the positive value of half of the encoder's CPR, then the initial phase is a first average value between the second displacement data and the fourth displacement data;
   if the second difference is both less than zero and less than the negative value of half of the encoder's CPR, then use a difference between the encoder's CPR and the fourth displacement data as fifth displacement data;
   calculating a second average value between the fifth displacement data and the second displacement data;
   if the fifth displacement data are greater than the second displacement data, then the initial phase is a sum of the second average value and the fourth displacement data;
   if the fifth displacement data are less than or equal to the second displacement data, then the initial phase is a difference between the second displacement data and the second average value;
   if the second difference is both greater than zero and greater than the positive value of half of the encoder's CPR, then use a difference between the encoder's CPR and the second displacement data as sixth displacement data;
   calculating a third average value between the sixth displacement data and the fourth displacement data;
   if the sixth displacement data are greater than the fourth displacement data, then the initial phase is a sum of the third average value and the second displacement data; and
   if the sixth displacement data are less than or equal to the fourth displacement data, then the initial phase is a difference between the fourth displacement data and the third average value.

10. A system for controlling a permanent magnetic synchronous motor, comprising a control unit, a motor to be detected and an encoder, wherein:
   the control unit is electrically connected to a rotor of the motor and to the encoder;
   the rotor is coaxially connected to the encoder;
   the control unit, through the encoder, sequentially acquires:
      first displacement data which register the rotor's position at a Q-axis after the rotor spins from an initial position to the Q-axis;
      second displacement data which register the rotor's position at a D-axis after the rotor spins from the Q-axis to the D-axis;
      third displacement data which register the rotor's position at a negative Q-axis after the rotor spins from the D-axis to the negative Q-axis; and
      fourth displacement data which register the rotor's position at the D-axis after the rotor spins from the negative Q-axis to the D-axis;
   the control unit obtains an initial phase of the motor based on the second displacement data, the fourth displacement data and the encoder's CPR; and
   the control unit determines a phase sequence of the motor based on the first displacement data, the second displacement data and the encoder's CPR.

11. The system in claim 10, wherein the control unit is configured for:
   calculating a first difference between the first displacement data and the second displacement data;
   comparing the first difference with a positive or negative value of half of the encoder's CPR; and
   determining the phase sequence of the motor based on an outcome of the comparing step.

12. The system in claim 11, wherein the control unit is configured for:
   if the first difference is greater than zero but less than the positive value of half of the encoder's CPR, then the motor is wired in a positive phase sequence;
   if the first difference is both less than zero and less than the negative value of half of the encoder's CPR, then motor is wired in a positive phase sequence;
   if the first difference is less than zero but greater than the negative value of half of the encoder's CPR, then motor is wired in a negative phase sequence; and
   if the first difference is both greater than zero and greater than the positive value of half of the encoder's CPR, then motor is wired in a negative phase sequence.

13. The system in claim 10, wherein:
   the control unit includes a CPU and a memory;
   the CPU initiates a Q-axis current control stage for moving the rotor towards the Q-axis;
   the CPU acquires the first displacement data through the encoder when the rotor arrives at the Q-axis;
   the CPU initiates a D-axis current control stage for moving the rotor towards the D-axis;
   the CPU acquires the second displacement data through the encoder when the rotor arrives at the D-axis;
   the CPU initiates a negative Q-axis current control stage for moving the rotor towards the negative Q-axis;
   the CPU acquires the third displacement data through the encoder when the rotor arrives at the negative Q-axis;
   the CPU initiates the D-axis current control stage for moving the rotor towards the D-axis; and
   the CPU acquires the fourth displacement data through the encoder when the rotor arrives at the D-axis.

14. The system in claim 10, wherein the control unit is configured for:

calculating, based on the second displacement data, the fourth displacement data and the encoder's CPR, a position corresponding to a line bisecting the minimum included angle defined by a position corresponding to the second displacement data and a position corresponding to the fourth displacement data.

15. The system in claim 14, wherein the control unit is configured for:

calculating a second difference between the second displacement data and the fourth displacement data;

comparing the second difference, separately, with the positive value of half of the encoder's CPR and with the negative value of half of the encoder's CPR;

if the second difference is greater than the negative value of half of the encoder's CPR but less than the positive value of half of the encoder's CPR, then the initial phase is a first average value between the second displacement data and the fourth displacement data;

if the second difference is both less than zero and less than the negative value of half of the encoder's CPR, then use a difference between the encoder's CPR and the fourth displacement data as fifth displacement data;

calculating a second average value between the fifth displacement data and second displacement data;

if the fifth displacement data are greater than the second displacement data, then the initial phase is a sum of the second average value and the fourth displacement data;

if the fifth displacement data are less than or equal to the second displacement data, then the initial phase is a difference between the second displacement data and the second average value;

if the second difference is both greater than zero and greater than the positive value of half of the encoder's CPR, then use a difference between the encoder's CPR and the second displacement data as sixth displacement data;

calculating a third average value between the sixth displacement data and the fourth displacement data;

if the sixth displacement data are greater than the fourth displacement data, then the initial phase is a sum of the third average value and the second displacement data; and if the sixth displacement data are less than or equal to the fourth displacement data, then the initial phase is a difference between the fourth displacement data and the third average value.

\* \* \* \* \*